UNITED STATES PATENT OFFICE.

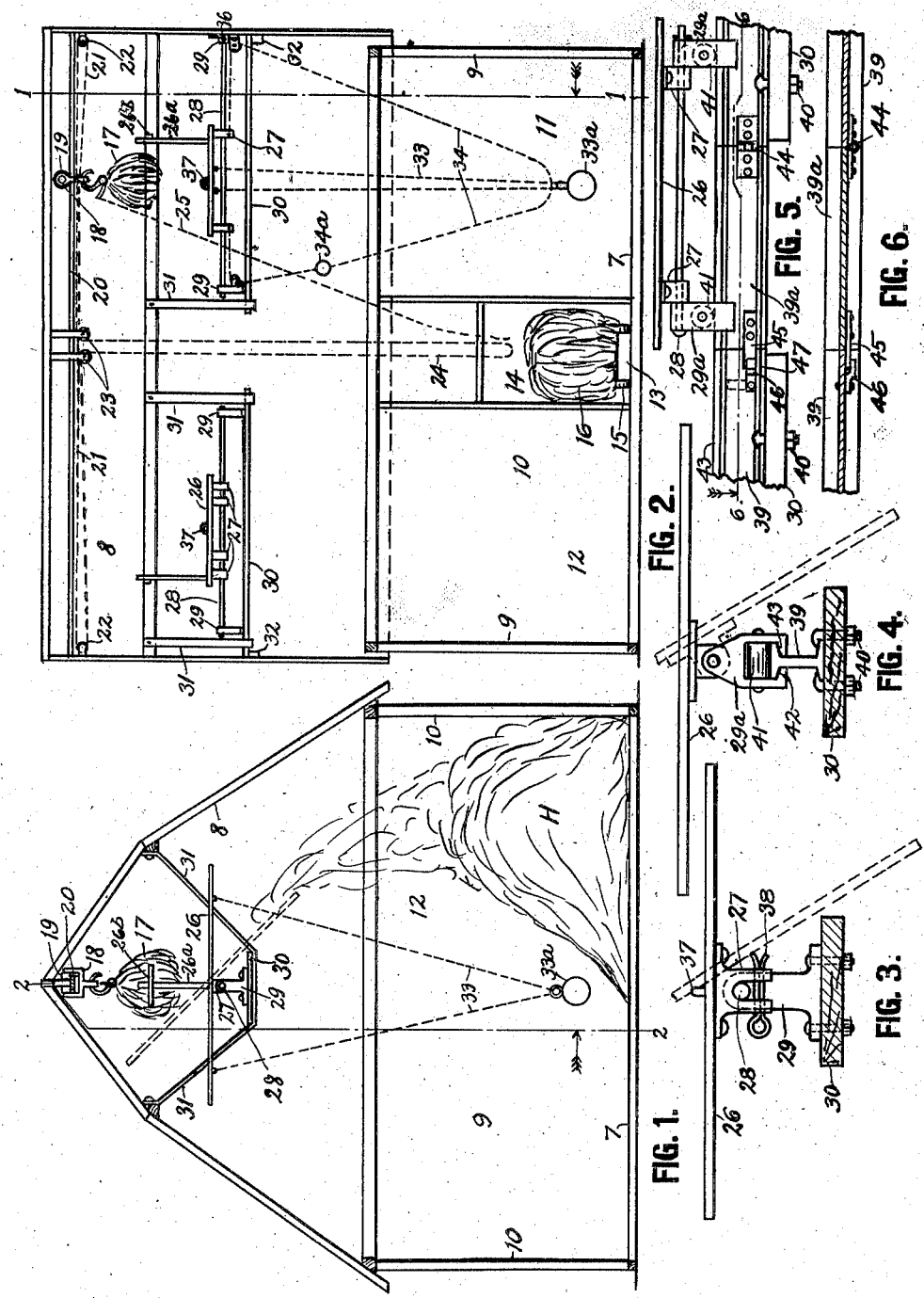

ALBERT A. DE MARCE, OF CADOTT, WISCONSIN.

HAY-SPREADER FOR BARNS AND HAY-SHEDS.

1,321,991.  Specification of Letters Patent.  Patented Nov. 18, 1919.

Application filed May 21, 1919. Serial No. 298,665.

*To all whom it may concern:*

Be it known that I, ALBERT A. DE MARCE, a citizen of the United States, residing at Cadott, in the county of Chippewa and State of Wisconsin, have invented a new and useful Hay-Spreader for Barns and Hay-Sheds, of which the following is a specification.

My invention relates to devices for spreading the hay as it is deposited in barns or sheds, and the object is to provide an inexpensive and easily operated device of said kind.

In the accompanying drawing, Figure 1 is a vertical section as on the line 1—1 in Fig. 2 of a barn equipped with my hay spreader. Fig. 2 is a longitudinal vertical section of said barn about as on the line 2—2 in Fig. 1. Fig. 3 is a portion of Fig. 1 enlarged and showing a modification. Fig. 4 is Fig. 3 further modified. Fig. 5 is a side elevation of the track rail 39 shown in Fig. 4 and the parts mounted on the rail. Fig. 6 is a section on the line 6—6 in Fig. 5.

Referring to the drawing by reference numerals, 7 designates the floor, 8 the roof, 9 the end walls and 10 the side walls of a barn, which may be of any desired size and shape, or it may be a mere shed in which hay is often stored, but for convenience I have illustrated a barn, the length of which is abnormally short owing to the limited space on the drawing so it contains only two mows, 11 and 12 with an intermediate driveway 13 extending through two opposite door openings of which one, 14, is shown in Fig. 2. Upon said driveway or path is usually driven a wagon as 15, with a hay load 16, to the middle of the barn; though the pathway may also be near one end of the barn or even outside the barn, near the usual open door, and hay hoisting device of the barn.

The various hoisting devices by which the hay is raised from the wagon being well known, I will not here describe them, but the hay is raised in charges similar to 17 and carried by some form of carriage 18, having wheels 19 rolling on a track 20 along the top of the roof; the carriage being moved by a rope 21, which extends over sheaves 22 and through guiding hangers 23, below which it forms a bight 24, by which the operator standing on the load may operate the rope and thus move the carriage to and from the different places of the barn, whereupon he pulls a rope 25 and thereby trips the fork or sling, as the case may be, holding the charge of hay, so that the hay may drop upon the platform or upon either platform if more than one be employed, as will presently be more fully described.

Now to cause the dropped hay to spread as shown at H in Fig. 1, each platform 26 is journaled at the middle by boxes 27 slidable on a horizontal bar 28, which has its ends secured in bearings 29 fixed upon a base plank 30. Said plank, or planks, one over each mow, or over about one half of the barn, are each supported by braces 31 from the roof above it, or may have one end secured to the end wall of the barn by a cleat 32, in which event the adjacent brace 31 may be omitted, as to the right in Fig. 2. The main idea is to keep the supporting means of the plank out of the way for the hay and the platform.

Fixed upon the outer edge of each platform is a cross shaped stake 26ª, and secured to the tilting ends of the platform are the ends of a rope 33, having a weight 33ª fixed at the middle of it.

34 is a special rope, which is guided by pulleys 35 and secured with its ends to the platform, or to its supporting bearings 27. On one arm of the bight of said rope is fixed a weight 34ª. If only one platform is used and the bearings 27 are integral around the bar 28, the platform may be moved from one mow to another by detaching the bar 28 from its stands 29, in which it is simply held by a set-screw 36, and then by applying the hoisting device to a staple or eye 37 fixed in the platform, the latter may be transferred to the desired mow and its bar 28 secured in the stands or bearings 29 of the new location.

Another way to transfer the platform is to have each base plank 30 permanently provided with a bar 28, and then have the bearings 27 open at the bottom and provided with a cotter pin 38 close below the bar. By removing and replacing said cotter pins, the bearings may be transferred with the platform from one to another of the bars 28. In either case the bar 28 must not obstruct the vertical passage for the hay to be hoisted from the wagon.

In the modification shown in Figs. 4, 5 and 6 an I-beam 39 is secured by bolts 40 as a single track rail upon the planks 30, and the bearings 29ª are permanently retained on the bar or rod and provided with rollers 41, rolling on the rail, and hooks 42, taking loosely below the flanges 43 of the rail. Said rail extends from end to end of the barn, but is provided with a loose portion 39ª, which is hinged at 44 to swing out of the way for the hay being hoisted; the other end of it is provided with a short arm 45 adapted to be held by a latch 46 against the side of the web of the rail and to rest upon the base flange 47 of the rail; in which position it holds the rail piece 39ª as an inserted bridge in the gap of the rail, so that the platform may ride with the rollers 41 over said gap whenever so desired in moving it along the barn, and after it has crossed the bridge 39ª, the latter is unlocked and swung out of the way for the hoisting of the hay.

In the operation of the device, the weight 33ª and rope 33 tend at all times to hold the platform in horizontal position and the weight 34ª tends to hold the platform with one of its bearings 27 against the bearings 29 that is nearest to the hoisting shaft or passage. Now when the charge of hay is hoisted up and is being pulled by the rope 24 to the desired part of the barn it moves against the stake 26ª—26ᵇ and moves the platform along the track in a position to receive the hay, when the desired place is reached the trip rope 25 is pulled and as the hay drops on the platform, the latter will tilt, possibly till it stops against the edge of the track base 30, and dump the hay toward one side wall or the other of the barn, and then the weight 33ª will restore the platform to level position and the weight 34ª will pull it toward the operator on the hay load. Whenever this operation by one person becomes insufficient because the hay may not accumulate evenly in both sides of the barn, an assistant operator is placed on the barn floor or in the hay thereon, and operates the ropes 33 and 34 by hand so as to cause the more exact and desired placing of the hay as the barn fills up, or at any time when exact distribution of the hay is desired. The work of the assistant operator is of course much facilitated by the weights 33ª and 34ª, so he needs only to control the action of the weight 34ª, by holding on to the arm of rope 34 having no weight, and as for rope 33, he signals the operator on the load to pull the trip when the charge of hay is at the desired place, and as the hay drops on the platform, the assistant operator does not depend on accidental tilting of the platform in either direction but he so pulls the rope 33 that the platform tilts in the direction he may desire. Of course if so desired, the assistant operator may operate said ropes 33 and 34 without any weights attached to them. This as well as the number of platforms used depends on the size of the barn and other circumstances like scarcity of help to perform labor. In some cases it will be preferable to have two platforms or one for each mow, and thus never transfer any of them across the hoisting passage.

Having thus described my invention, what I claim is:

1. In a barn or other structure for housing hay, the same having an overhead track and means for transporting and dropping charges of hay from said track, a hay spreading device mounted in the barn below said track and comprising a track base extending in longitudinal central direction of the barn, the same as the overhead track, one or more track bars mounted upon the track base, a platform fulcrumed in balanced position on said track bar to tilt toward either side of the barn, and means operable from the barn floor for holding the platform level and for tilting it toward either side of the barn.

2. The structure specified in claim 1, said track base having upwardly extended hangers securing it to the roof of the barn.

3. The structure specified in claim 1, said track base being wide enough to engage and stop the tilting of the platform after it has been sufficiently inclined to let the hay slide off from it.

4. The structure specified in claim 1, and means operable from the barn floor for moving the platform to different parts of its track.

5. The structure specified in claim 1, said platform being readily transferable to any part of the said track base in the barn.

6. The structure specified in claim 1, said platform having upon one end means for the charge of hay to engage and move the platform along its track.

7. The structure specified in claim 1, said holding and tilting means for the platform comprising a flexible strand having its ends secured one to each end of the platform and forming a bight suspended within reach of a person standing on the barn floor.

8. The structure specified in claim 7 and a weight fixed to the lowest point of said bight.

9. The structure specified in claim 6, said means for moving the platform along its track, comprising a flexible strand forming a bight which has its arms guided upon the structure of the building and attached to the platform.

10. The structure specified in claim 9, and a weight secured on one arm of the bight and tending to hold the platform normally near one end of its track.

In testimony whereof I affix my signature.

ALBERT A. DE MARCE.